Patented Apr. 13, 1948

2,439,399

UNITED STATES PATENT OFFICE 2,439,399

PROCESS FOR THE PREPARATION OF ACETYL PEROXIDE

Edward S. Shanley, Kenmore, and Harlow G. Hyatt, Buffalo, N. Y., assignors to Buffalo Electro-Chemical Company, Inc., Tonawanda, N. Y.

No Drawing. Application May 12, 1944, Serial No. 535,392

5 Claims. (Cl. 260—610)

The present invention relates to a reagent containing diacetyl peroxide and to a method of preparing the same.

Diacetyl peroxide is the first member of a series of organic peroxides. It has been known for many years and its properties have been studied and recorded. Diacetyl peroxide possesses many characteristics which make it eminently suitable for use as an organic oxidant of high activity, as an alkylation reagent, as a polymerization catalyst, as well as other uses of lesser importance.

Although many organic peroxides possess the properties enumerated, diacetyl peroxide is of particular interest as it possesses a relatively large amount of available oxygen and may be prepared from low-cost raw materials. Commercial utilization of these advantageous properties of diacetyl peroxide have not heretofore been possible by reason of the fact that diacetyl peroxide itself is a relatively unstable material as it is extremely sensitive to shock, decomposing under shock conditions with extreme violence. In fact, diacetyl peroxide in the crystalline state is characterized as a member of a group of materials having extremely high shock sensitivity much greater than that possessed by mercury fulminate.

As a consequence of these characteristics and behavior, substantially all investigations dealing with the preparation and properties of diacetyl peroxide have been carried out in ethyl ether solution. Thus every operative prescription for the preparation of acetyl peroxide listed in Beilstein specifies the use of ethyl ether as a medium in which the preparation should be made. Several procedural variations from that of Beilstein are to be found in the literature, all of which involve the reaction of acetic anhydride and hydrogen peroxide, or a percompound which liberates hydrogen peroxide upon treatment with acetic acid, but all are performed in the presence of ethyl ether.

This choice of ethyl ether as a reaction medium arises from the fact that it is a mutual solvent for aqueous hydrogen peroxide, acetic anhydride and the resultant end product, diacetyl peroxide. In fact, ethyl ether is an excellent medium, insofar as this reaction itself is concerned, in which to prepare diacetyl peroxide. However, the resulting ethereal solution of acetyl peroxide can be handled and used only with the greatest precautions by reasons of the inflammability of this medium and the presence of a material possessing a relatively high content of readily available oxygen. However, the ethereal solution is somewhat less hazardous than crystalline acetyl peroxide. The experience of investigators dealing with the ethereal solutions is that they are hazardous materials to work with, entirely aside from the fire hazard always associated with such solutions, by reason of their tendency to spontaneous explosion. A possible explanation for this behavior resides in the fact that explosive peroxides may be produced from ethyl ether even in contact with oxygen of the air. This tendency undoubtedly exists to a much greater extent under the strong peroxidizing conditions existing during the preparation of the acetyl peroxide and by reason of its presence in solution in ethyl ether. Furthermore, during partial evaporation of this solvent, ether peroxides may deposit on the container walls and these, by their spontaneous detonation, may initiate the explosion of the whole peroxide content of the system.

Subsequent attempts have been made to prepare diacetyl peroxide in mutual solvents in which the fire hazard and the formation of peroxides with the solvent are relatively less. However, these experiments produce diacetyl peroxide in only a very small yield. In fact, many of these attempts have been unsuccessful as the desired peroxide has been obtained in the solvent layer either not at all or at yields of only a few percent, the presumption being that these organic mediums were non-solvents for all of the reactants, notably hydrogen peroxide, or did not provide a suitable reaction medium for inducing peroxidation of the acetic anhydride or acetic acid. See Feiser and Oxford, for example, J. A. C. S. 64, 2060 (1942).

It is an object of the present invention to provide a method for preparing acetyl peroxide by the employment of relatively non-inflammable organic solvents as the reaction medium.

It is also an object of the invention to prepare diacetyl peroxide in the presence of an organic medium in which all of the reactants are not soluble but in which diacetyl peroxide is soluble.

It is also an object of the invention to provide a method wherein diacetyl peroxide may be produced with excellent yield in the presence of a non-mutual solvent which is non-inflammable and which is not subject to peroxidation.

It is also an object of the invention to provide a method for the production of diacetyl peroxide which obviates all of the disadvantages of the prior art methods of procedure.

In accordance with the procedures of the present invention, diacetyl peroxide may be prepared in organic solvents of the ester type with excellent yields even though the organic solvent employed be a non-mutual solvent for the reactants employed in producing diacetyl peroxide. To this end, water insoluble esters are chosen as the reaction medium in which diacetyl peroxide is soluble and, therefore, the spent aqueous by-products can be decanted from the resultant peroxide solution or layer. Thus typical solvents for this purpose are those water insoluble esters of the formula RCOOR' where R and R' are mono or polyvalent organic radicals. By reacting hydrogen peroxide, or a percompound yielding hydrogen peroxide with acetic acid, with acetic anhydride or acetic acid, acetyl peroxide is formed in good yield and is found in the non-aqueous ester layer. Solutions of diacetyl peroxide in such esters may be formed in relatively high concentrations, with good yields, and the solutions may be used, handled and transported with perfect safety, as they are free from the danger of spontaneous or induced explosion. These solutions are suitable for use directly as polymerization of vinyl compounds, for the bleaching of oils, for carrying out organic syntheses involving diacetyl peroxide, and for many other purposes.

The following examples are intended to illustrate the practice of the present invention but are not to be deemed as limitative thereof:

Example I 102 g. acetic anhydride was dissolved in 320 g. dimethyl phthalate and the mixture was cooled to —5° C. To this cold mixture was added 41 g. sodium peroxide and then, with agitation, 100 g. ice. After agitating vigorously for about 15 minutes, the aqueous layer was separated from the dimethylphthalate. The phthalate solution was dried over calcium chloride and filtered, yield 404 g. containing 2.8% active oxygen, by iodine titration. Calculated as acetyl peroxide, this corresponds to 84 g. or 70% of the theoretical yield. That this active oxygen was not due to the presence of peracetic acid was indicated by the slow reaction with KI. A portion of the organic layer was shaken with an excess of water. No hydrogen peroxide could be found in this water (titanium sulfate test), which indicated that the oxygen in the organic layer was not present as hydrogen peroxide. In consequence of these tests and observations on the properties of the solution, it is established that the active oxygen content is actually due to dissolved acetyl peroxide.

Example II 40 ml. methyl methacrylate was placed in a flask and cooled to —5° C. To this was added 10.0 g. acetic anhydride and then 50 g. sodium hydroxide pellets. 6.0 ml. of 30% hydrogen peroxide was then added with vigorous agitation, during about 25 min. The mixture was allowed to stand, with occasional agitation, for about 15 minutes additional, after which the organic layer was decanted off, weighed and titrated. Yield 41 g. Active oxygen content 2.0%. This corresponds to 6.05 g. acetyl peroxide which is 51% of the theoretical yield.

Example III

To 50 ml. dioctyl phthalate was added 10 g. acetic anhydride and, after cooling to —5° C., 11 g. barium dioxide suspended in 15 ml. water. This mixture was agitated vigorously for about 15 minutes, with cooling. The organic layer was separated and dried. Yield 47 g. Active oxygen content 2.4%. This corresponds to 8.3 g. acetyl peroxide which is 72% of the theoretical.

In all the instances above, the ester was not miscible with water but was a solvent for acetyl peroxide. Esters generally, if water insoluble, may be employed as the non-mutual solvent with production of a reagent that can be stored, transported and used in alkylation, polymerization and other reactions where acetyl peroxide itself finds utility. The ester solutions are not readily inflammable and not subject to shock detonation as is the crystalline acetyl peroxide and solutions thereof in ether.

The reaction may take place with any percompound, i. e. a material yielding hydrogen peroxide such as the alkali metal peroxides, alkaline earth metal peroxides, other metal peroxides, the perborates, percarbonates and the like. Generally alkaline hydrogen peroxide or the peroxides of alkali and alkaline earth metals will be found most suitable. In the claims, these substances are comprehended within the term inorganic peroxy compound.

What is claimed is:

1. The method of making acetyl peroxide which comprises reacting acetic anhydride and hydrogen peroxide in the presence of an ester which is a non-mutual solvent.

2. The method of making acetyl peroxide which comprises reacting acetic anhydride and hydrogen peroxide in the presence of an ester of phthalic acid.

3. The method of making acetyl peroxide which comprises reacting acetic anhydride and hydrogen peroxide in the presence of dioctyl phthalate.

4. The method of making acetyl peroxide which comprises reacting acetic anhydride and hydrogen peroxide in the presence of dimethyl phthalate.

5. The method of making acetyl peroxide which comprises reacting acetic anhydride and hydrogen peroxide in the presence of methyl methacrylate.

EDWARD S. SHANLEY.
HARLOW G. HYATT.

REFERENCES CITED

The following references are of record in the file of this patent:

UNITED STATES PATENTS

| Number | Name | Date |
|---|---|---|
| 2,068,424 | Mark | Jan. 19, 1937 |
| 2,200,437 | Voss | May 14, 1940 |
| 2,339,058 | D'Alelio | Jan. 11, 1944 |
| 1,754,914 | Stoddard | Apr. 15, 1930 |

FOREIGN PATENTS

| Number | Country | Date |
|---|---|---|
| 39,107 | Austria | Oct. 11, 1909 |

OTHER REFERENCES

Beilstein, "Handbuch der Organischen Chemi," 4th ed., vol. II, page 170.